April 13, 1926. 1,580,220

H. SCHWARZE

TELEPHONE INSTALLATION

Filed July 11, 1921

Inventor:
Herman Schwarze
By His Attorneys:

Patented Apr. 13, 1926.

1,580,220

UNITED STATES PATENT OFFICE.

HERMAN SCHWARZE, OF DETROIT, MICHIGAN, ASSIGNOR TO GENERAL MOTORS CORPORATION, OF DETROIT, MICHIGAN, A CORPORATION OF DELAWARE.

TELEPHONE INSTALLATION.

Application filed July 11, 1921. Serial No. 483,866.

*To all whom it may concern:*

Be it known that I, HERMAN SCHWARZE, a citizen of the United States, and a resident of Detroit, county of Wayne, and State of Michigan, have invented certain new and useful Improvements in Telephone Installations, of which the following is a full, clear, concise, and exact description, such as will enable others skilled in the art to which the invention relates to make and use the same, reference being made therein to the accompanying drawings, which form a part of this specification.

The invention relates to equipment for motor vehicles and is particularly concerned with an installation for motor vehicles having a passenger compartment and wherein it is desirable to provide for telephonic communication between the said compartment and the driver's station.

In motor vehicles having closed bodies, and especially in those of the limousine or like types in which the passenger compartment is separated from the driver's compartment or station by a partition, it has been proposed to provide a telephone set comprising a receiver adjacent to the driver's station and a transmitter conveniently located for the use of the passenger. By this means the passenger, without leaving his seat, is enabled to give suitable directions to the driver without distracting the attention of the latter from the control of the car and without interference from the street noises or the like.

The principal object of my invention is the provision of a new and improved installation of the character above referred to having especial advantages in respect to convenience, neatness of appearance, and efficiency in operation.

A further object is to provide for the concealment, so far as practicable, of the working parts of the telephone apparatus while still maintaining ready accessibility for inspection or repairs.

Further objects and advantages will appear from the following description taken in connection with the accompanying drawings, in which Fig. 1 is a perspective view showing a portion of the interior of a closed car body having associated therewith one embodiment of my invention;

Figures 1, 2, 3, 4:
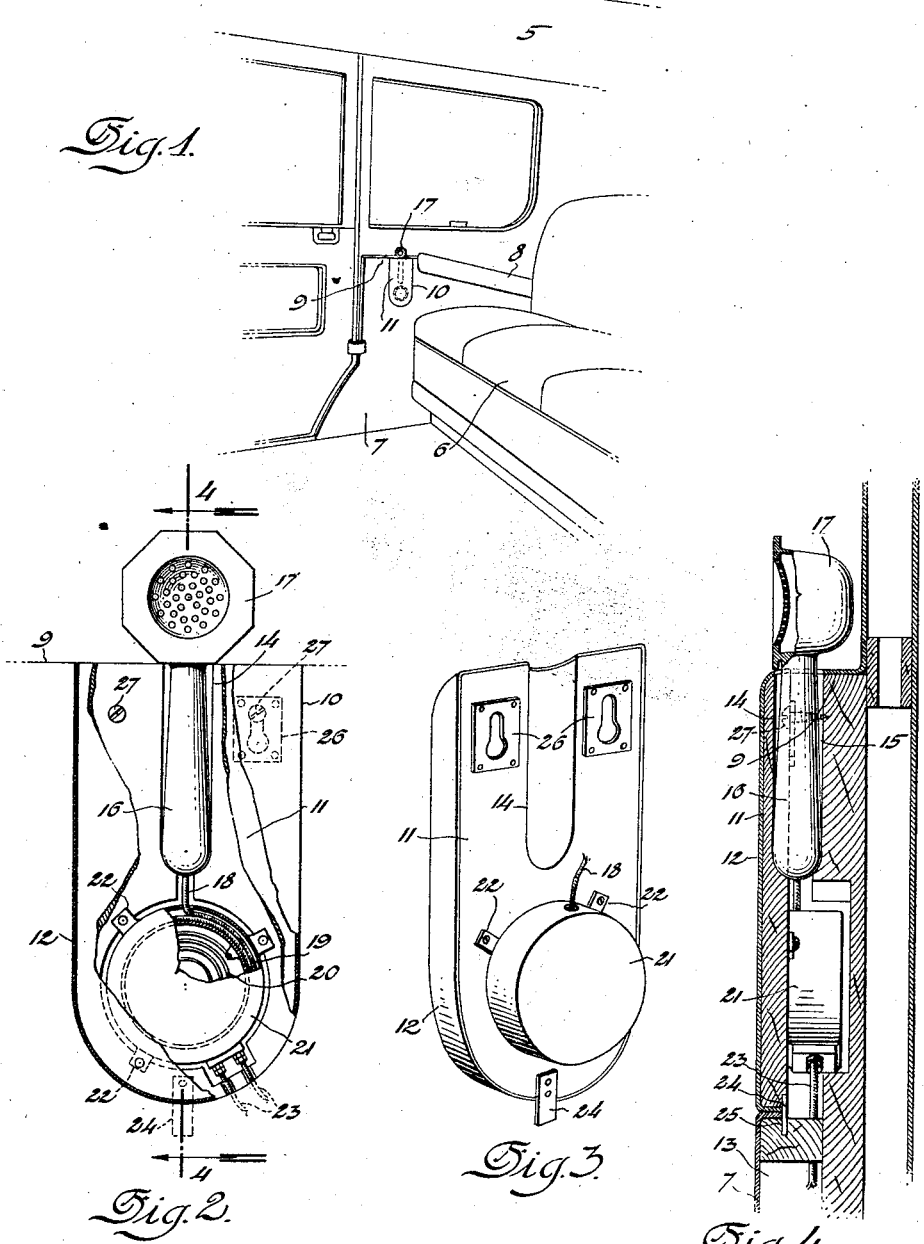
Fig. 2 is an enlarged elevation of the telephone apparatus and mounting, parts being broken away.
Fig. 3 is a perspective view of a removal panel upon which parts of the telephone apparatus may be supported.
Fig. 4 is a vertical section on line 4—4 of Fig. 2.

Referring to the drawings, 5 indicates a motor vehicle body having a seat 6 for passengers, and a side wall 7. The specific details of the car body are, of course, not material, as my invention is applicable generally to closed cars. In the form illustrated, an arm rest 8 is provided at the end of the seat, and the wall 7 is formed with a ledge 9 extending forwardly from the arm rest 8. A recess 10 is formed in the wall 7 extending downwardly from the ledge 9. A panel 11 fits snugly in this recess and is shaped preferably to conform to the contour of the wall and ledge so as to be flush with the surfaces thereof. The exterior of the panel may be covered with upholstery 12 similar to the upholstery 13 of the body wall 7. In the panel 11 is formed a pocket 14 adapted, either alone or in conjunction with a depression 15 in the rear of the recess 10, to receive the handle portion 16 of a telephone instrument 17 of any suitable type embodying a transmitter, or, if desired, a combined transmitter and receiver. The telephone conductors 18 leading from the instrument 17 are arranged to be coiled upon a reel 19 automatically actuated, as by a spiral spring 20, to wind the conductor cable thereon. The reel may be housed within a casing 21 secured by suitable fastening means 22 to the panel 11, as illustrated, or to the wall of the car, if desired, in position to be covered by the panel. The conductors comprised in the cable 18 may be connected in any usual or suitable manner to the leads 23 which will extend to the desired position adjacent to the station of the driver where they will be connected to the receiver or other instrument, not shown.

The panel 11 will be removably secured to the wall of the car by means which, of course, may be varied in accordance with the contour of the wall and the relationship of the panel thereto. Where the wall is formed with a ledge having a recess, as shown, within which the panel fits, the securing means may comprise a positioning lug 24 adapted to fit a hole 25 in the lower end of recess 10, and slotted plates 26, secured to the rear of the panel and adapted to slip over the heads of screws 27 in the body wall. Should it be desired to mount the apparatus upon a car wall not provided with a ledge, it may, of course, be necessary to make the panel of sufficient depth and form recesses or pockets therein of suitable character to house the reel and telephone instrument upon or within the panel itself. The pocket for reception of the instrument may be varied in position and shape as desired to accommodate the design of the instrument employed and of the body wall, it being desirable especially that the instrument be so housed as to protect the same while holding it in convenient position within reach of the passenger, and that the conductors, reel, etc. shall be normally concealed.

It will be seen that the invention as described provides a telephone equipment wherein the instrument for the passenger's use is held in an inconspicuous but readily accessible position, where it is not liable to injury or interference, and that the entire mechanism is so mounted and housed as not to detract from the neatness of appearance of the car. On occasion, however, by merely removing the detachable panel, the parts are easily and quickly rendered accessible for inspection or repair.

In addition to the variations in details of construction herein referred to, it will be understood that many other changes may be made without departing from the spirit and scope of the invention and therefore I do not desire to be limited to the specific structure herein described except as required by the language of the appended claims in view of the prior art.

I claim:

1. In telephone apparatus, the combination of a vehicle body wall, a telephone instrument, and a panel detachably connected to said body wall, said panel formed with a pocket adapted to receive said instrument and having means for retaining the conductor cables therefor.

2. In telephone apparatus for closed vehicles, the combination of a body wall having a recess, a panel fitting within said recess flush with said wall, a spring reel housed behind said panel and a telephone instrument, said panel adapted to support said instrument and the conductor cable of said instrument being wound upon said reel.

3. In telephone apparatus for closed vehicles, the combination of a vehicle body having a seat for passengers and a ledge adjacent to said seat, said body having a recess therein below said ledge, a panel removably mounted in said recess and having a pocket formed therein, an automatic reel mounted upon the rear face of said panel, and a telephone instrument adapted to be positioned in said pocket and having the conductor cable thereof wound upon said reel.

In testimony whereof I affix my signature.

HERMAN SCHWARZE.